Figure 1:
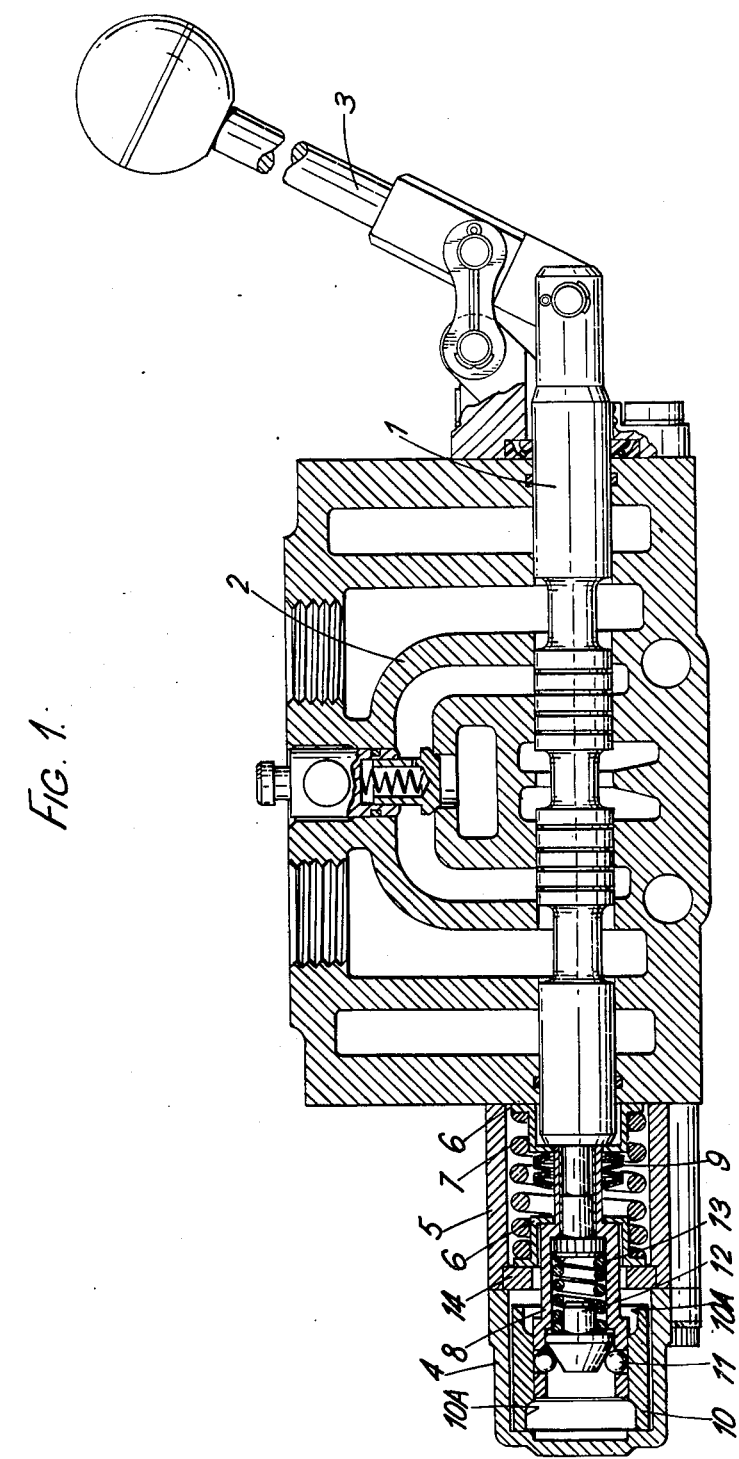

United States Patent [19]

Singleton

[11] 4,049,235
[45] Sept. 20, 1977

[54] DETENTS FOR LOCKING MOVABLE ELEMENTS

[75] Inventor: Anthony Singleton, Grantham, England

[73] Assignee: Kontak Manufacturing Company Limited, Great Britain

[21] Appl. No.: 659,516

[22] Filed: Feb. 19, 1976

[30] Foreign Application Priority Data

Feb. 19, 1975 United Kingdom ............... 06902/75

[51] Int. Cl.² ............................................. F15B 13/01
[52] U.S. Cl. ................................ 251/297; 137/625.69
[58] Field of Search .................... 251/297; 137/625.69

[56] References Cited

U.S. PATENT DOCUMENTS 3,762,442  10/1973  Paul ...................................... 251/297

Primary Examiner—Alan Cohan
Assistant Examiner—Gerald A. Michalsky
Attorney, Agent, or Firm—Lane, Aitken, Dunner & Ziems

[57] ABSTRACT

A double-acting spool-type hydraulic control valve having a spring centered spool is described, the spool centering spring being arranged in conventional manner between two spring seats which bear in opposite directions on an end portion of the spool within a cover secured to one end face of the valve body. The spool is capable of a degree of over-travel beyond each of the maximum flow positions, which over-travel is resisted by an auxiliary spring arranged within the centering spring. Ball-and-recess type detent elements are provided for holding the spool at either of the maximum flow positions, these detent elements being arranged at the free end of the centering spring cover. The recessed detent element is shiftable on the spool axis between stops so that the spool can shift to a detented maximum flow position after having been forced to over-travel to permit registration between ball and recess.

1 Claim, 2 Drawing Figures

DETENTS FOR LOCKING MOVABLE ELEMENTS

This invention relates to detents, for example spool detents in hydraulic control valves.

Hydraulic control valves are known which incorporate a spool shiftable, by means of a manual control lever, from a "neutral" position to one or more of "maximum flow" positions. Usually, in such valves, variable flow control is achieved according to different spool positions intermediate the neutral position and the maximum flow position. Moreover, it is usual in such valves that the spool is constantly urged towards the neutral position by means of a return spring. Where the spool is shiftable from the neutral position in either of mutually opposite directions to two different maximum flow positions, the return spring is called a "centering spring." In some practical applications, it is desirable that the spool may be held at a maximum flow position by means of a releasable detent capable of resisting the return spring. In other applications, such a detent is undesirable. Hitherto proposed arrangements offering a spool detent which is optionally engageable at a maximum flow position suffer the disadvantage that exercise of the option has to be made prior to moving the manual control lever, for example by appropriately setting a separate selector or the like. Thus, with such previous arrangements, it is required to establish in advance whether or not the detent facility is desirable. This requirement detracts from overall flexibility, especially in installations having several control valves, and allows error or lack of foresight to cause inefficient operation or even accidents.

An object of the present invention is to provide a detent for use with a spool-type hydraulic control valve, the detent being optionally engageable at a maximum flow position of the spool and obviating or mitigating the aforesaid disadvantage.

According to one aspect of the present invention, there is provided a detent for use with a spool-type hydraulic control valve, comprising a cage member having means defining a bore, a carrier axially slidable in said bore for attachment to a valve spool, a resiliently depressible element arranged in the carrier and pressing on said bore, means defining a recess in said bore engageable by said depressible element to effect detent, and stop means engageable by the cage member and allowing the cage member to shift within limits defined by the stop means in directions parallel with the axis of said bore.

According to another aspect of the present invention, there is provided a control device having a housing, a control element which is shiftable in the housing between first and second positions, an operating member connected to the control element and operable manually to shift the control element, return spring means continuously biassing the control element towards the first position, the control element being shiftable beyond the second position in a direction away from the first position, second spring means arranged to augment the manual effort required to shift the control element beyond the second position, and releasable detent means for holding the control element at the second position, said detent means including detent elements which are mutually engageable upon movement of the control element beyond the second position, one of said detent elements being shiftable to permit the control element when the detent elements are engaged to shift to the second position.

Further, according to the present invention, there is provided a spool-type hydraulic control valve incorporating a detent as aforesaid.

Figure 2:
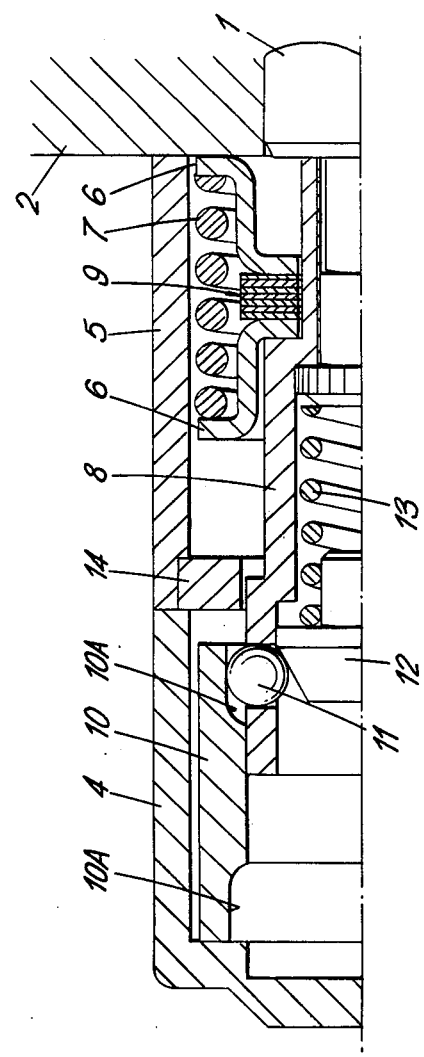

An embodiment of the invention will now be described, by way of example, with reference to the accompanying drawings, in which:

FIG. 1 is a sectional elevation showing a detent in accordance with the present invention in combination with a spring-centered manually operable hydraulic control valve of the sliding spool type; and FIG. 2 is a sectional elevation similar to part of FIG. 1 to a larger scale and shows the valve spool at one extreme of its full range of movement.

In the drawings, a combined spring centre and detent unit is arranged at the left hand end of a spool 1 housed in valve body 2 and operable manually by means of a control lever 3. The unit mechanism is contained within a housing formed by a cap 4 and an extension piece 5 both of which are rigidly attached to the valve body 2 by bolts. The right hand compartment of the unit constitutes the spring centering mechanism where two spring seats 6 are urged apart by a return or centering spring 7 and engage the opposite ends of the right hand compartment and also the end face of the spool and the shoulder of a detent carrier 8 in such a manner that virtually no axial movement of the spool 1 can take place without the centering spring 7 being compressed. A second spring in the form of a nest 9 of disc springs is fitted over the detent carrier 8 and between the spring seats 6. The axial distance between the inner faces of the spring seats 6 less the axial length of the disc spring nest 9 is equal to the distance which the spool 1 travels from its centre position to either maximum flow position.

When the spool 1 is at either maximum flow position, the inherent rigidity of the disc springs of nest 9 is sufficiently high to prevent most accidental over-travel or overstroking of the spool 1 but is not high enough to prevent deliberate overstroking. Therefore, movement of the spool 1 to the left will cause the right hand spring seat 6 to travel towards the left hand seat and this movement will be opposed by the centering spring 7. With normal forces applied to the control lever 3, spool movement will cease when the inner faces of both spring seats 6 abut the disc spring nest 9. In this position, the full rated capacity of hydraulic fluid can pass through the control valve.

Movement of the spool 1 to the right causes the left hand spring seat 6 to be carried by the shoulder on the detent carrier 8 towards the right hand seat 6 in a manner similar to that described above. When the control lever 3 is released from either maximum flow position, the centering spring 7 returns the spool 1 to its normal central or rest position.

The left hand compartment of the unit houses the detent means and contains a floating detent cage 10 carried from one end of the compartment to the other by the friction created between its inside diameter and radially depressible elements in the form of balls 11 held by a tapered thrust pin 12 biassed to the left by a detent spring 13. The centering spring and the detent compartments are separated by a buffer plate 14 which serves as an abutment for the left-hand spring seat 6. The buffer plate 14 and the cap 4 together constitute stop means to limit axial movement of the cage 10.

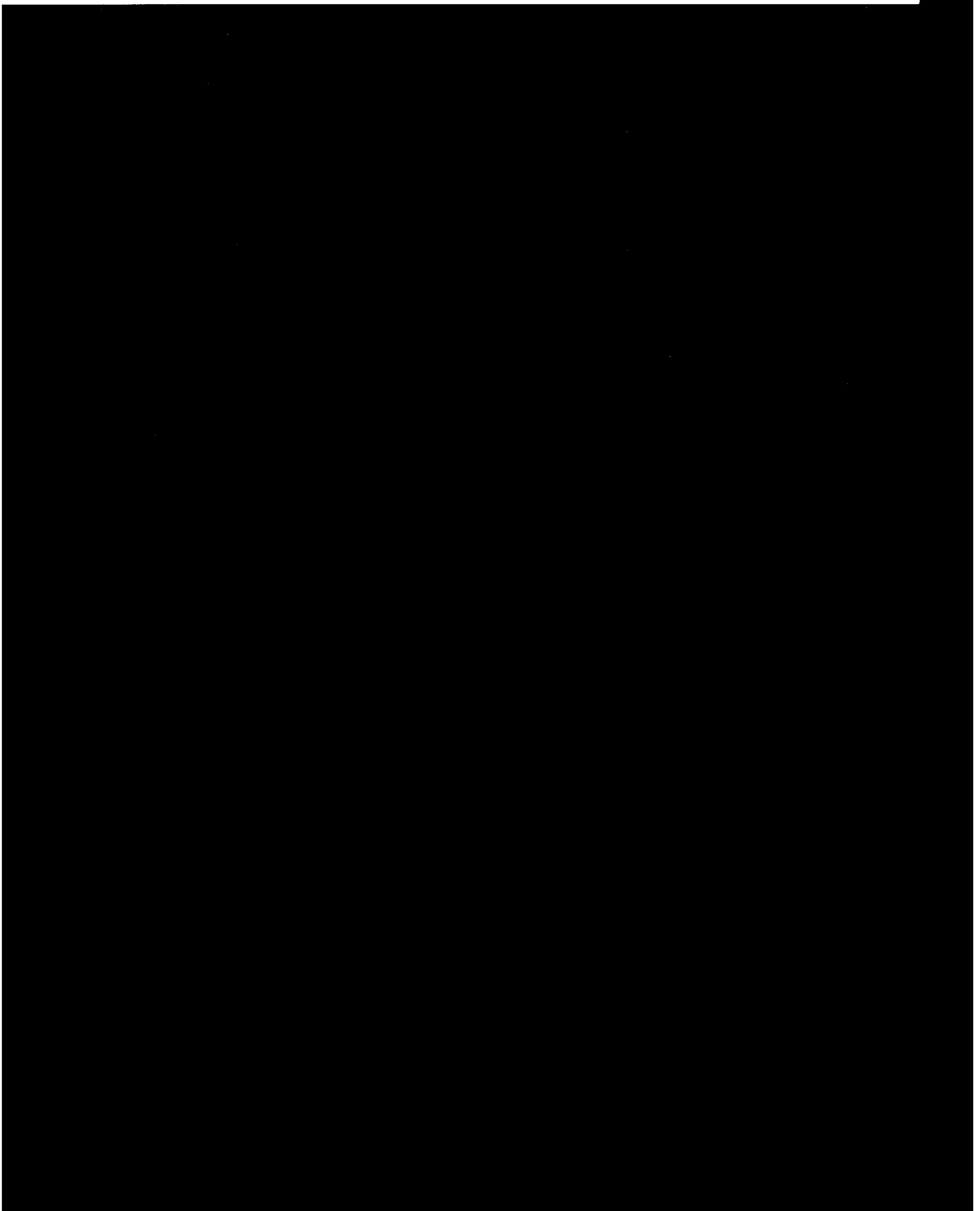

Movement of the spool 1 to the right causes the detent cage 10 to move to the right until it makes contact